United States Patent [19]

Faitel

[11] Patent Number: 4,537,087
[45] Date of Patent: Aug. 27, 1985

[54] ROTARY CHAIN DRIVE MECHANISM WITH PERIODIC OUTPUT DWELL

[75] Inventor: William M. Faitel, Detroit, Mich.

[73] Assignee: Lamb Technicon Corp., Warren, Mich.

[21] Appl. No.: 490,123

[22] Filed: Apr. 29, 1983

[51] Int. Cl.³ .................. F16H 35/02; F16H 27/04
[52] U.S. Cl. ................................ 74/394; 74/63; 74/84 R
[58] Field of Search ............ 74/37, 82, 84 R, 393, 74/394, 63

[56] References Cited

U.S. PATENT DOCUMENTS

| 3,068,708 | 12/1962 | Hain | 74/37 |
| 3,127,777 | 4/1964 | Pietsch | 74/37 |
| 3,307,415 | 3/1967 | Dobbs | 74/37 |

*Primary Examiner*—Lawrence J. Staab
*Attorney, Agent, or Firm*—Barnes, Kisselle, Raisch, Choate, Whittemore & Hulbert

[57] ABSTRACT

A rotary drive mechanism with periodic output dwell includes a fixed sprocket mounted on one end of a fixed hollow shaft. A drive input is rotatable on the hollow shaft and is coupled to a frame assembly which includes an arcuate plate coplanar with the fixed sprocket. A pair of idler sprockets are carried by the frame on opposite sides of the fixed sprocket at uniform spacing with respect thereto, with the peripheral edge of the arcuate plate extending from adjacent the peripheries of the idler sprockets at uniform radius with respect to the axis of the fixed sprocket and fixed shaft. An endless chain is looped around the sprockets and slidably along the plate edge. An output drive arm is fixed to an output shaft extending through the fixed hollow shaft. A slider is carried in a slot extending lengthwise of the arm and is affixed to the endless chain for driving the arm and output shaft as a function of travel of the endless chain around the fixed and idler sprockets and over the plate edge.

8 Claims, 13 Drawing Figures

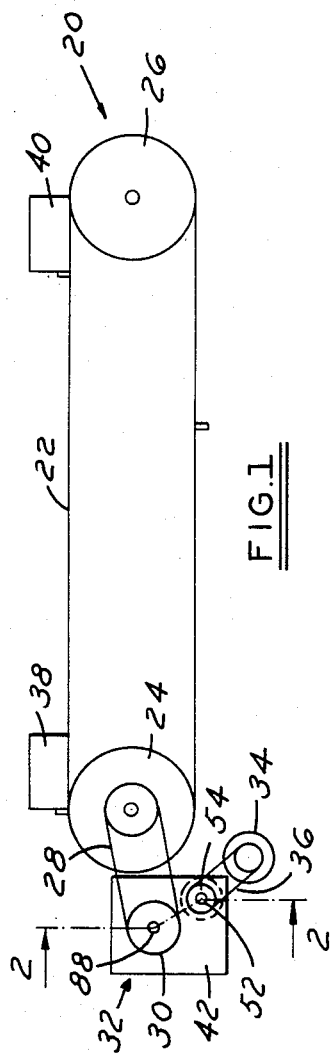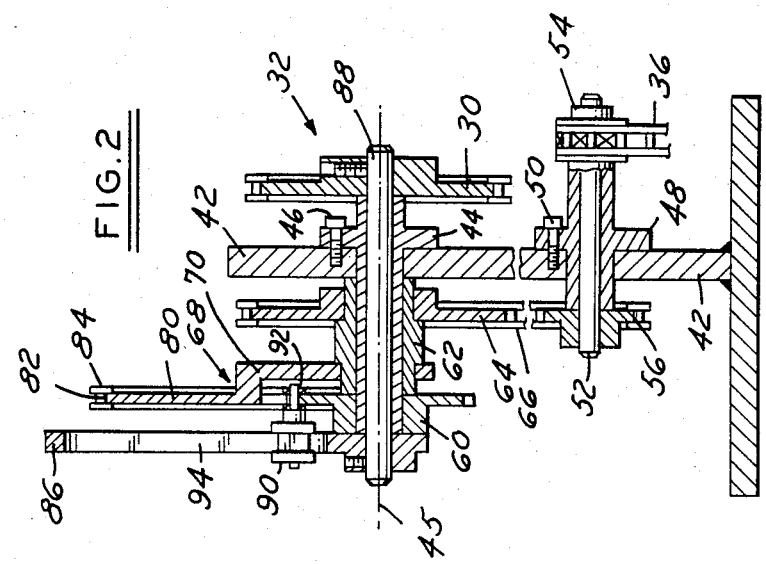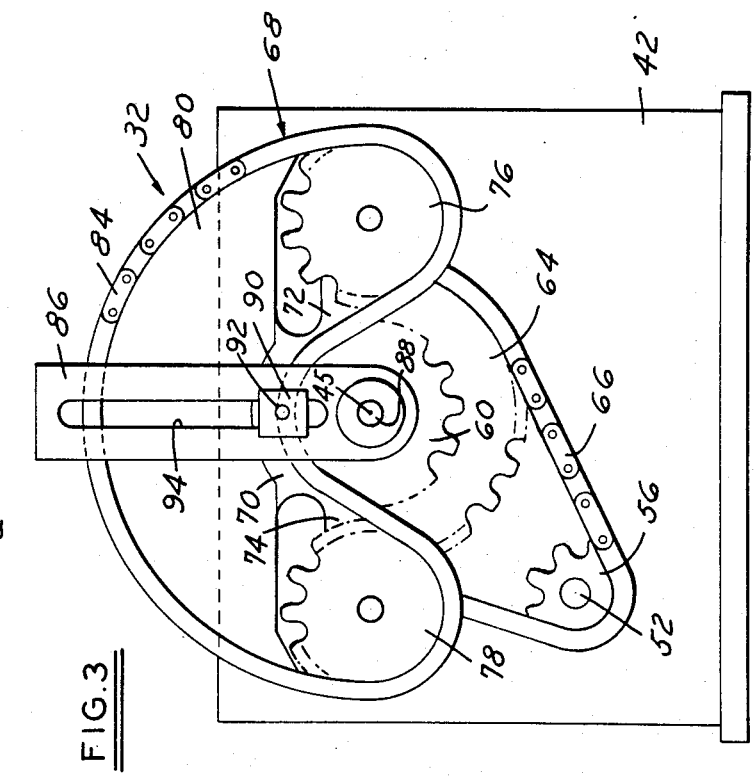

ROTARY CHAIN DRIVE MECHANISM WITH PERIODIC OUTPUT DWELL

The present invention is directed to rotary drive mechanisms of a type adapted to be used for driving conveyors, and more particularly to a drive mechanism which translates a constant velocity rotary input into an output which starts from rest and uniformly accelerates to a period of constant velocity followed by uniform deceleration to a dwell period.

Constant velocity drive mechanisms for conveyors which produce a periodic output dwell during which the conveyor stops to add or remove a workpiece have previously been proposed in a form of slip clutches, torque converters, hydrostatic drives and other relatively expensive and complex devices. High cost and complexity of devices of this type make improvements desirable in the area of economy, simplicity and reliability.

An object of the present invention is to provide a rotary drive mechanism of the described type which employs conventional and inexpensive mechanical elements, specifically drive chains and sprockets, to obtain the desired constant velocity and dwell output characteristics from a constant velocity rotary input.

The invention, together with additional objects, features and advantages thereof, will be best understood from the following description, the appended claims and the accompanying drawings in which:

FIG. 1 is a schematic elevational view of a conveyor of the type in which the drive mechanism of the invention may be used;

FIG. 2 is a sectional view of the drive mechanism taken along the line 2—2 in FIG. 1;

FIG. 3 is a rear elevational view of the drive mechanism as shown in FIG. 2;

Figure 4:
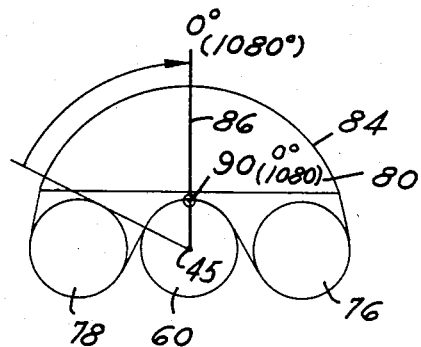
FIGS. 4–11 are schematic drawings illustrating operation of the drive mechanism in accordance with the invention.
Figure 5:
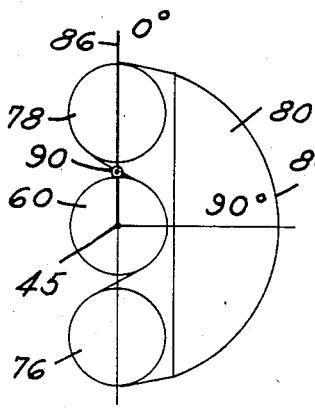
Figure 6:
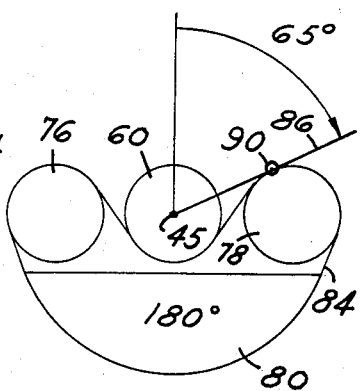
Figure 7:
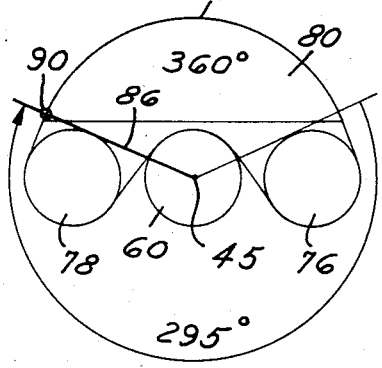
Figure 8:
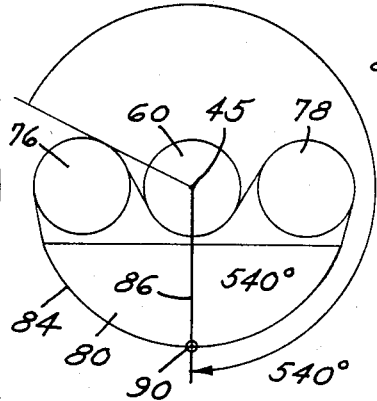

FIG. 1 illustrates a conveyor 20 as including an endless belt or chain 22 looped around a drive roller or sprocket 24 and around an idler roller or sprocket 26. Drive roller or sprocket 24 is coupled by a chain 28 to the output sprocket 30 of a rotary drive mechanism 32 in accordance with the present invention. The input to drive mechanism 32 is obtained through a V-belt or the like 36 from a constant velocity motor 34. As will be described in greater detail hereinafter, conveyor 20 is driven by mechanism 32 to obtain zero velocity or dwell at the workpiece placement and removal stations illustrated at 38,40, followed by uniform acceleration and uniform workpiece displacement velocity between stations 38,40 and uniform deceleration to another dwell period.

Drive mechanism 32 is illustrated in detail in FIGS. 2 and 3 as comprising a vertical fixed support 42 having a flanged bearing sleeve 44 affixed thereto by the screws 46. A second flanged bearing sleeve 48 is likewise affixed to support 42 by the screws 50. An input shaft 52 is journalled in sleeve 48 to rotate on an axis parallel to the axis 45 of sleeve 44. A pulley 54 is keyed to one end of shaft 52 and is coupled by V-belt 36 to motor 34 (FIG. 1). A sprocket 56 is fixed on the opposite end of shaft 52. A first sprocket 60 is fixed on sleeve 44 coaxially with the sleeve and at the end remote from support 42. A hollow cylindrical bearing 62 is journalled between fixed sprocket 60 and support 42 for rotation of sleeve 44. An input sprocket 64 is fixed on bearing 62 adjacent to support 42 and is coupled by a chain 66 to sprocket 56 and input shaft 52 for imparting rotary motion to bearing 62.

A generally arcuate frame and sprocket assembly 68 is mounted on bearing 62 at an end remote from support 42. Frame and sprocket assembly 68 includes a frame 70 having a pair of opposed radial arms 72,74 extending in opposite directions from the axis of fixed sleeve 44. A pair of idler sprockets 76,78 are mounted on the respective arms 72,74 in coplanar relation with fixed sprocket 60, and with the axes of rotation of sprockets 76,78 being equidistant from and coplanar with the axis of fixed sprocket 60. Frame 70 includes a generally semi-circular plate 80 which is coplanar with and spaced radially outwardly of fixed sprocket 60. Plate 80 has an arcuate peripheral surface or edge 82 which extends from adjacent the outer periphery of sprocket 76 to adjacent the outer periphery of sprocket 78 at uniform radius with respect to axis 45.

An endless chain 84 is looped around sprockets 60,76 and 78 and is slidably carried along edge 82 of plate 80. Preferably, plate 80 is of a thickness adapted to fit between the links of chain 84, as illustrated in FIG. 2, for guiding the chain through an arcuate path between sprockets 76,78. An output shaft 88 is journalled within sleeve 44 for rotation about axis 45. An arm 86 is fixed to the end of shaft 88 remote from sprocket 30. A slider 90 is coupled by a pin 92 to chain 84, and is guided within a straight slot 94 in arm 86 for sliding motion axially of arm 86. Output sprocket 30 is mounted on the end of shaft 88 remote from arm 86 for driving conveyor 20 as previously described.

Figure 12:
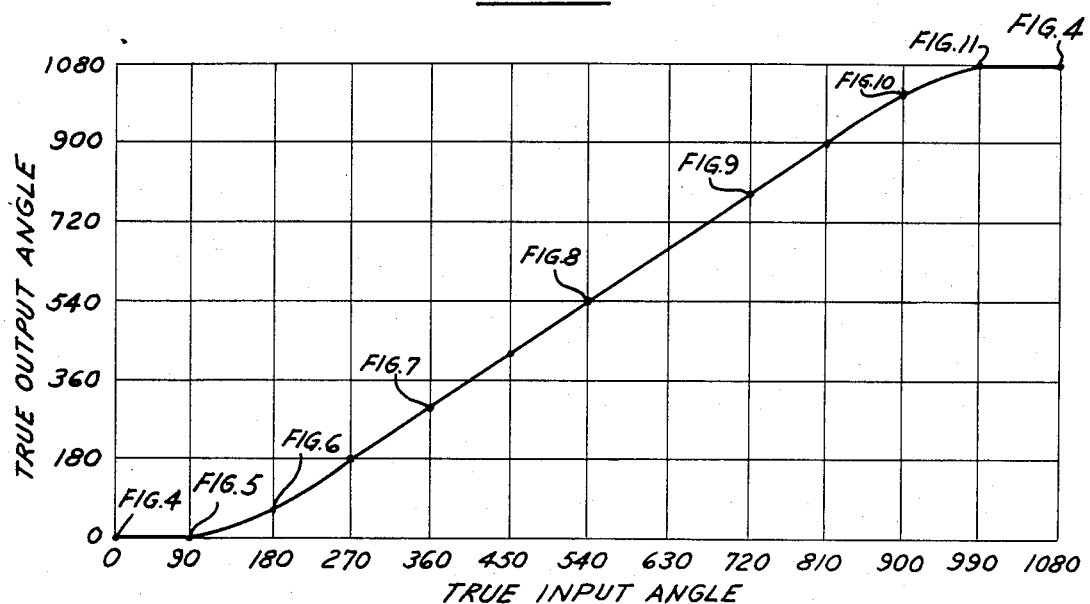
FIGS. 12 and 13 are graphic illustrations depicting output angle (FIG. 12) and output acceleration and velocity (FIG. 13) versus input angle in the drive mechanism illustrated in FIGS. 1–11.
Figure 13:
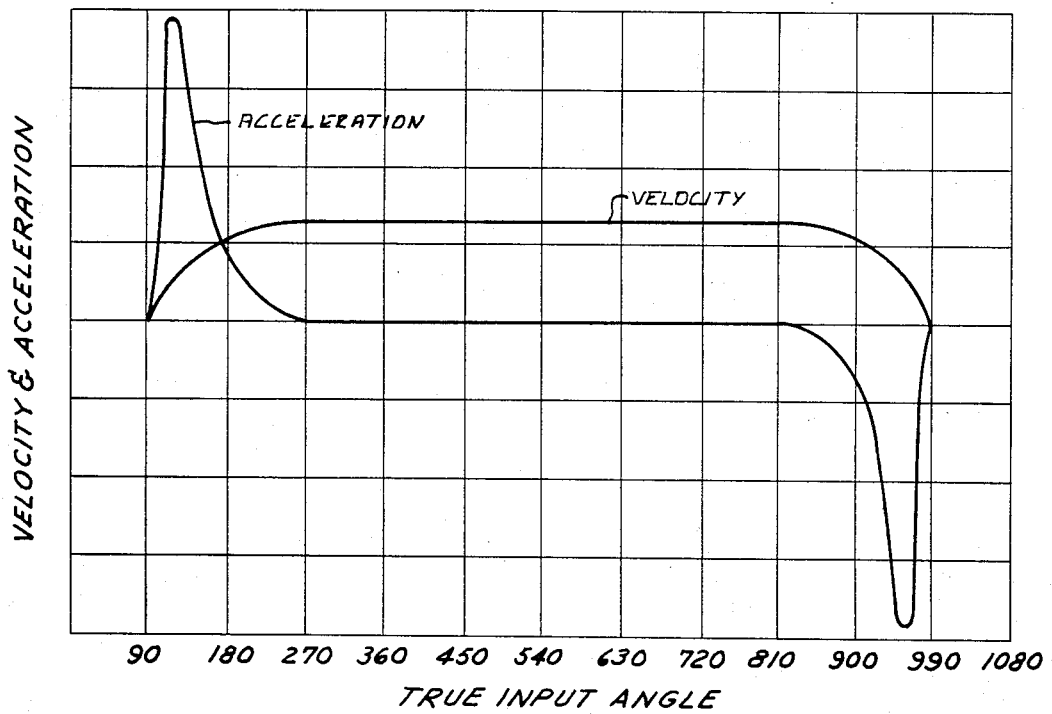

Operation of drive mechanism 32 will be explained in detail with reference to FIGS. 4–13. FIGS. 4–11 are schematic illustrations of fixed sprocket 60, idler sprockets 76,78, plate 80, chain 84, arm 86 and slider 90 at successive positions during one complete cycle of operation. FIGS. 12 and 13 are graphic illustrations of arcuate displacement (FIG. 12) and velocity and acceleration (FIG.13) at such successive stages of operation. In general, input rotation imparted to frame and sprocket assembly 68 causes frame and sprocket assembly 68 and chain 84 to rotate on axis 45 around fixed sprocket 60. Since sprocket 60 is fixed, that portion of chain 84 wrapped therearound cannot move with respect to axis 45. Hence, rotation of the frame and sprocket assembly draws chain 84 around sprocket 76, over plate edge 82 and around sprocket 78 in a direction depending upon the direction of rotation of the frame and sprocket assembly. This chain motion is imparted to output shaft 88 through arm 86 and slider 90.

More specifically, in the position of FIG. 4 (and FIGS. 2–3), which is taken as the starting position for purposes of reference, arm 86 is in the vertical orientation and slider 90 is adjacent to the upper surface of fixed sprocket 60. These starting positions are illustrated as the zero degree positions in FIGS. 4, 12 and 13. As frame 70 and plate 80 rotate 90° clockwise (FIG. 4 to FIG. 5), sprockets 76,78 likewise rotate with the frame on which they are mounted. However, since sprocket 60 does not rotate and slider 90 is located at top dead center of sprocket 60, slider 90 and arm 86 remain in the zero position adjacent to fixed sprocket 60. During the next stage of operation (FIG. 5 to FIG. 6), slider 90 is lifted by chain 84 off of fixed sprocket 60 and begins to travel with the chain around idler sprocket 78. Chain 84 thus imparts angular motion to arm 86 through slider 90. As slider 90 moves away from axis 45, arm 86 and thus output shaft 88 are rapidly but uniformly and smoothly accelerated. At the position wherein plate 80 has rotated 270° from the starting position of FIG. 4, i.e. at a position between those illustrated in FIGS. 6 and 7, arm 86 will have rotated 180° from its initial position and slider 90 will be at the radially outermost edge of sprocket 78 relative to axis 45. From this point, slider 90 then travels over the peripheral edge of plate 80 at a uniform distance from output axis 45, thus imparting a uniform angular velocity to the output shaft. In the particular arrangement of the drawings, this uniform velocity is greater than the angular velocity of the input, so that the angular displacement of the output shaft equals the angular displacement of the input shaft at the 540° input angle position illustrated in FIG. 8.

Figure 9:
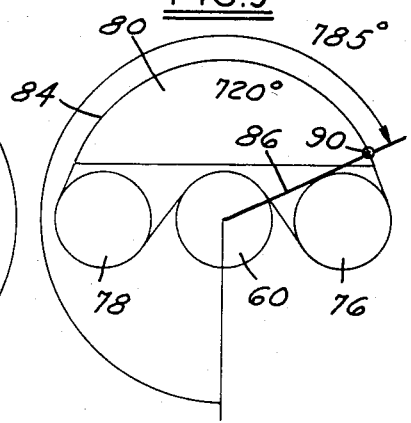
Figure 10:
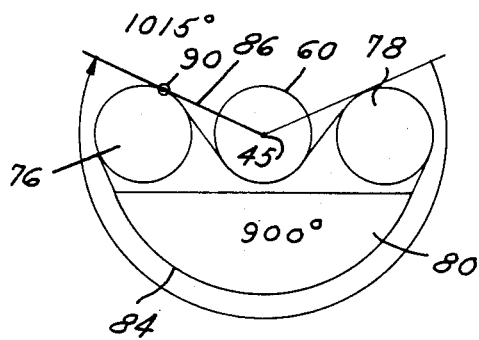
Figure 11:
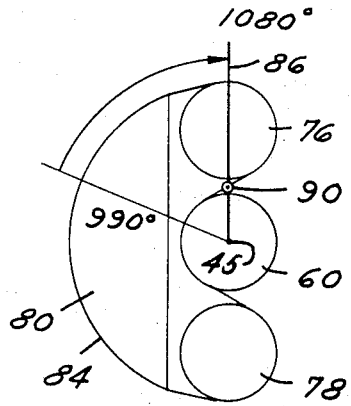

This uniform output velocity condition continues until the mechanism reaches a position between those illustrated in FIGS. 9 and 10 wherein the input displacement angle of plate 80 is 810° and arm 86 is again oriented vertically downwardly. At this point, slider 90 begins to move around idler sprocket 76, and the radius to the slider from axis 45 begins decreasing. Thus, angular rotation of arm 86 and output shaft 88 begins decelerating toward the position illustrated in FIG. 11 wherein slider 90 reaches the periphery of fixed sprocket 60. At this point, slider 90 and arm 86 have completed one cycle of operation and returned to the zero degree reference position. Thus, assuming a constant velocity input, the period of operation between the illustrations of FIGS. 11 and 5 (180° rotation of plate 80) represents a dwell in output rotation during which the conveyor 20 (FIG. 1) is stationary.

In the particular embodiment shown in the drawings, chain 84 has a length equal to three times the circumference of stationary gear 60. Thus, one complete indexing cycle consists of three complete revolutions of plate 80. The length of the cycle, and thus the length of travel of the conveyor, can be varied by varying the length of the chain.

Thus, an important feature of the preferred embodiment of the invention illustrated in the drawings resides in the provision of idler sprockets 76,78 at equal distances from the axis 45 of output sprocket 60 and in provision of an arcuate plate 80 having a chain-travel edge extending at uniform radius between the peripheries of the idler sprockets. With this construction, the angular velocity of the output remains constant during that period of operation in which slider 90 leaves the periphery of one idler sprocket and slides with chain 84 over the plate edge toward the other idler sprocket. It will be appreciated that the ratio of output to input angular velocities during this period of operation depends upon the relative sizes of the various sprockets in the drive chain. It will also be appreciated that the length of dwell period depends upon the ratio of the length of chain 84 lapping fixed sprocket 60 to the overall chain length, and may be increased or decreased by repositioning angularly sprockets 76,78 with respect to fixed sprocket 60. It is also within the scope of the invention in its broadest aspects to replace plate 80 with other means for routing chain 84 between idler sprockets 76,78, preferably at uniform radius with respect to the output axis, although not necessarily so in connection with the broadest aspects of the invention.

It will also be appreciated that the structure illustrated in the drawings which provides the output coaxial with the axis of operation of the chain drive mechanism is particularly simple and compact. However, sprockets and gears or the like may be coupled to arm 86 so as to provide a rotational output along some fixed axis other than axis 45 if desired.

The invention claimed is:

1. A rotary drive mechanism with periodic output dwell comprising
   input means including means for imparting rotary input motion about a fixed axis,
   a first sprocket coaxial with said fixed axis and fixed against rotation about said fixed axis,
   a frame coupled to said input means for corotation with said input means about said fixed axis,
   second and third sprockets coplanar with said first sprocket and carried by said frame for free rotation about axes disposed on opposite sides of said fixed axis, said axes being rotatable about said fixed axis conjointly with said frame,
   said frame including a chain guide which is coplanar with all of said sprockets and extends between said second and third sprockets,
   an endless chain slidably trained along said guide, around said second and third sprockets, and around a circumferential portion of said first sprocket adjacent to and radially inwardly of said guide,
   an arm mounted for rotation about said fixed axis, and
   means slidably carried by said arm and affixed to said chain for rotating said arm about said fixed axis as a combined function of rotation of said frame, said second and third sprockets, and said chain guide about said first axis, and motion of said chain around said sprockets and along said guide.

2. The rotary drive mechanism set forth in claim 1 further comprising hollow fixed support means having said first sprocket mounted on one end, said input means and said frame being rotatable externally of said support means, said mechanism further comprising an output shaft extending through and rotatable within said support means, said arm being coupled to said output shaft, said first sprocket being disposed along said fixed axis between said arm and said frame.

3. The rotary drive mechanism set forth in claim 1 wherein said chain guide extends in an arcuate path.

4. The mechanism set forth in claim 3 wherein said axes of rotation of said second and third sprockets are equidistant from and coplanar with said fixed axis, and wherein said arcuate path extends at uniform radius from said fixed axis between said second and third sprockets.

5. The rotary drive mechanism set forth in claim 1 wherein all of said axes are coplanar.

6. The rotary drive mechanism set forth in claim 5 wherein the axes of rotation of said second and third sprockets are equidistant from said fixed axis.

7. The rotary drive mechanism set forth in claim 6 wherein the second and third sprockets are of the same diameter.

8. The rotary drive mechanism set forth in claim 1 wherein the ratio of the length of said chain to the circumference of said first sprocket is a whole number greater than 1.

* * * * *